March 10, 1964

D. R. JOHNSON 3,123,925

SLIDE CHANGER

Filed Oct. 6, 1961

INVENTOR.
Delmar R. Johnson
BY
Ooms, McDougall and Hersh
Att'ys

March 10, 1964 D. R. JOHNSON 3,123,925
SLIDE CHANGER

Filed Oct. 6, 1961 5 Sheets-Sheet 3

INVENTOR.
Delmar R. Johnson
BY
Ooms, McDougall and Hersh
Att'ys

March 10, 1964
D. R. JOHNSON
3,123,925
SLIDE CHANGER
Filed Oct. 6, 1961
5 Sheets-Sheet 4
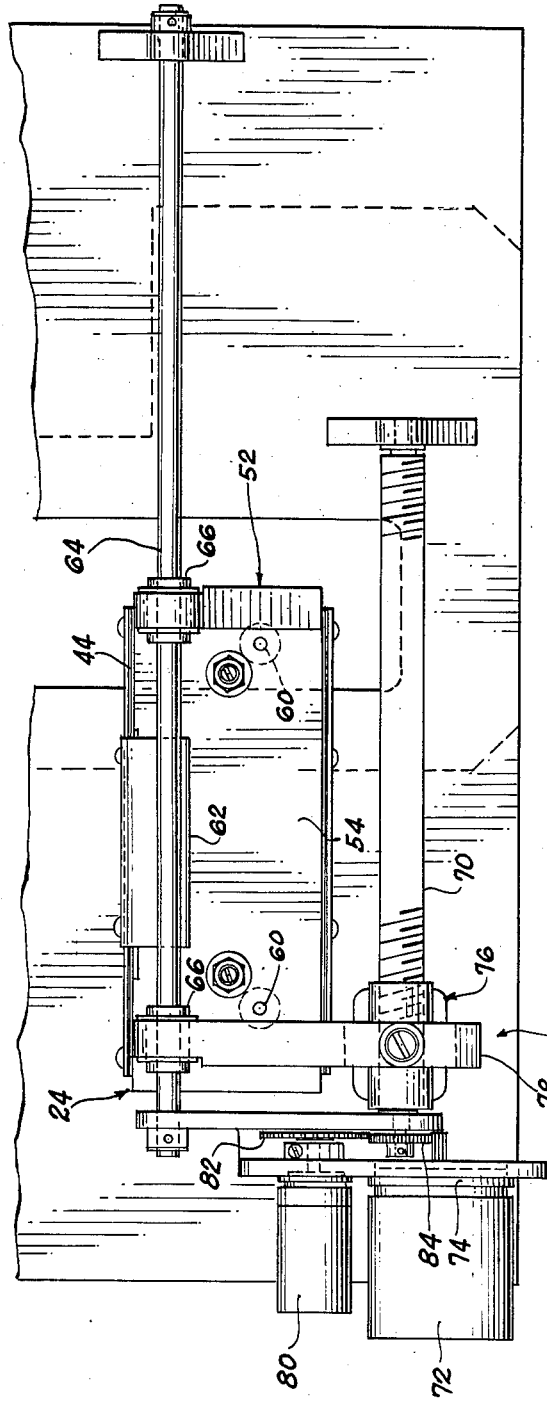
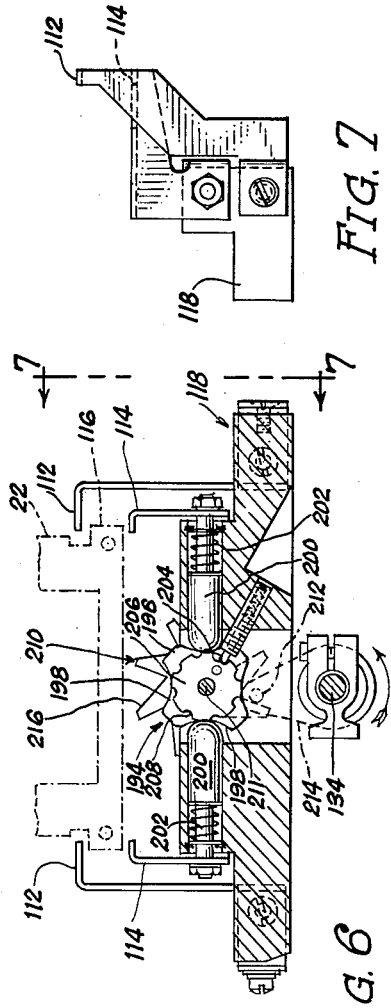
INVENTOR.
Delmar R. Johnson
BY Ooms, McDougall
and Hersh
Att'ys March 10, 1964 D. R. JOHNSON 3,123,925
SLIDE CHANGER Filed Oct. 6, 1961 5 Sheets—Sheet 5

INVENTOR.
Delmar R. Johnson
BY
Ooms, McDougall and Hersh
Att'ys

United States Patent Office 3,123,925
Patented Mar. 10, 1964

3,123,925
SLIDE CHANGER
Delmar R. Johnson, Chicago, Ill., assignor to Cook Electric Company, Chicago, Ill., a corporation of Delaware
Filed Oct. 6, 1961, Ser. No. 143,347
13 Claims. (Cl. 40—79)

This invention relates to a machine for mechanically transporting slides or transparencies between a magazine and a position in which the slide is adapted to be projected.

One object of the present invention is to provide a new and improved slide changer whereby a slide may be selected from the magazine, removed from the magazine, indexed to the viewing position, and returned to the magazine, all in an extremely precise and expeditious manner.

A further object is to provide a new and improved slide changer having an indexing disk or other device adapted to handle two or more slides, whereby the slide in the viewing position may be replaced with another slide very rapidly, in an interval of time amounting to only a fraction of a second.

It is a further object to provide a new and improved slide changer of the foregoing character having means for transferring the slides between the magazine and the indexing device, at a point displaced from the viewing position, so that the transfer may be effected without disturbing the slide which is being viewed.

Another object is to provide a new and improved slide changer of the foregoing character, having means for positioning the magazine as desired, so that any particular slide may be removed from or replaced in the magazine.

Further objects and advantages of the present invention will appear from the following description, taken with the accompanying drawings, in which:

FIG. 5 is a fragmentary top view of the slide changer.

FIG. 6 is a fragmentary section, taken generally along a line 6—6 in FIG. 1.

FIG. 7 is a fragmentary elevational view, taken generally as indicated by the line 7—7 in FIG. 6.

As just indicated, the drawings illustrate a slide changer 20 which is adapted to transport slides 22 between a magazine 24 and a viewing or projecting position 26. When the slide is in the viewing position 26, the image thereon may be projected on a screen by means of any conventional or suitable optical system, not shown.

Figure 1:
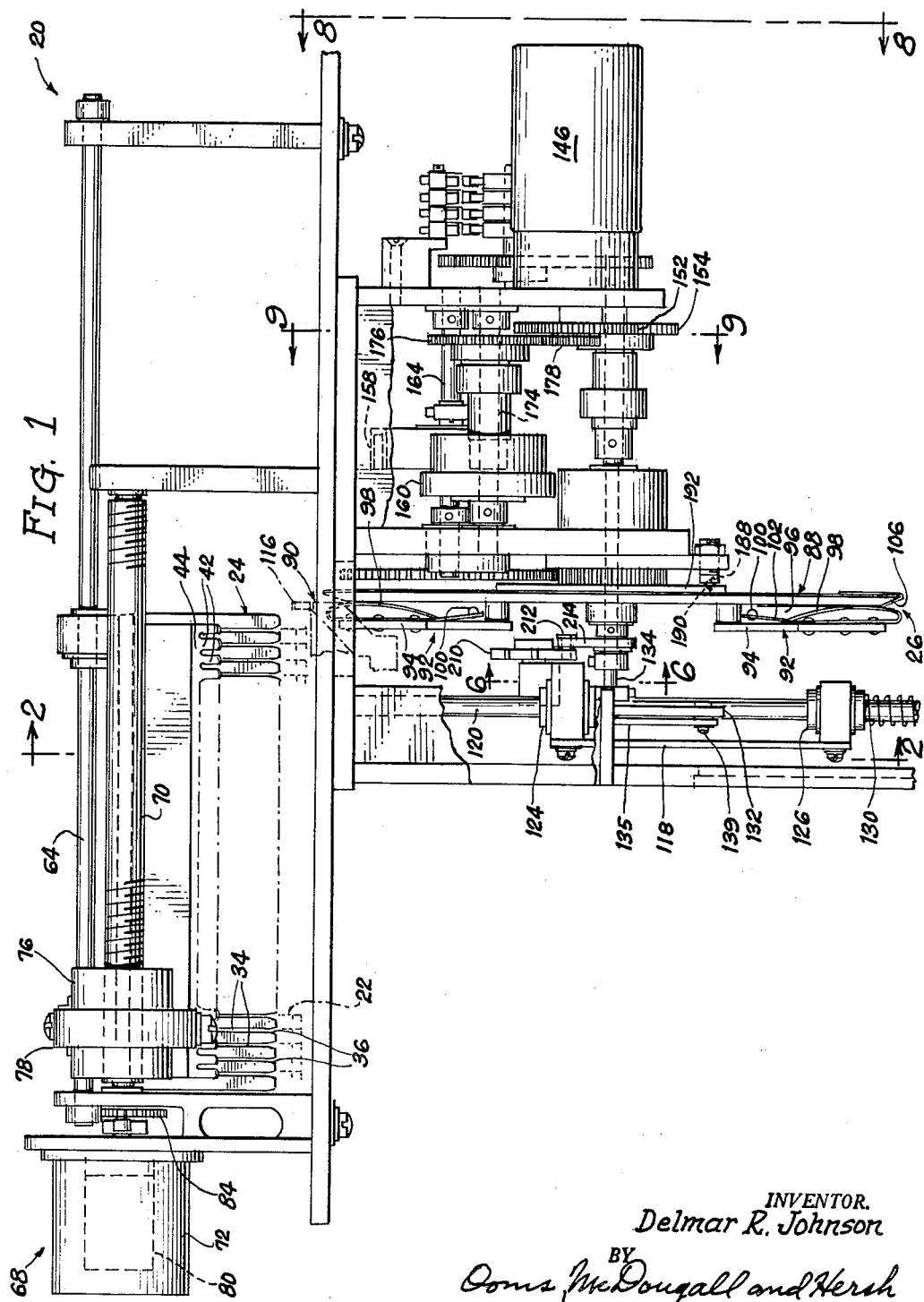
FIG. 1 is a side elevational view of a slide changer to be described as an illustrative embodiment of the present invention.

The magazine 24 is adapted to hold a large number of slides and is adapted to be translated longitudinally so that any desired slide will be in position to be removed from the magazine and indexed to the viewing position 26. While the construction of the magazine 24 may be varied, the illustrated magazine comprises a channel-shaped member 28 which is in the form of an inverted U in cross section. Thus, the member 28 has a top wall 30 and a pair of depending side walls or flanges 32. As shown to advantage in FIG. 1, the side walls 32 are formed with slots 34 adapted to receive the slides 22. Each of the slots 34 has a flared or enlarged entrance portion 36 so that the slide will be guided into the slot.

Figure 4:
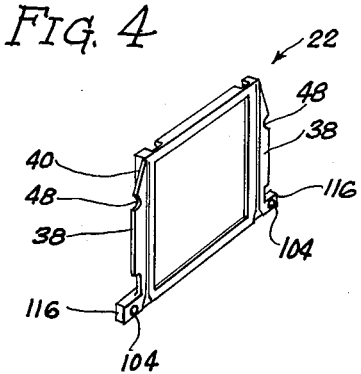
FIG. 4 is a perspective view showing one of the slides adapted to be handled by the slide changer.
Figure 8:
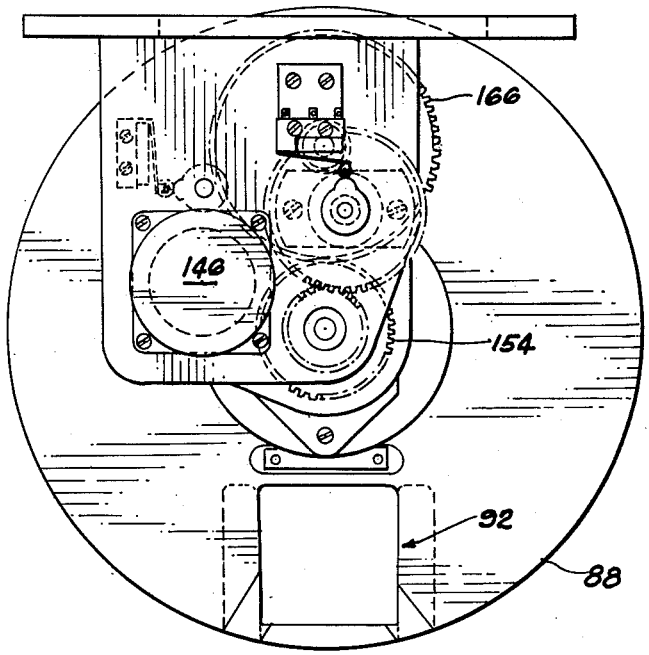
FIG. 8 is a fragmentary elevation, taken generally as indicated by a line 8—8 in FIG. 1.
Figure 9:
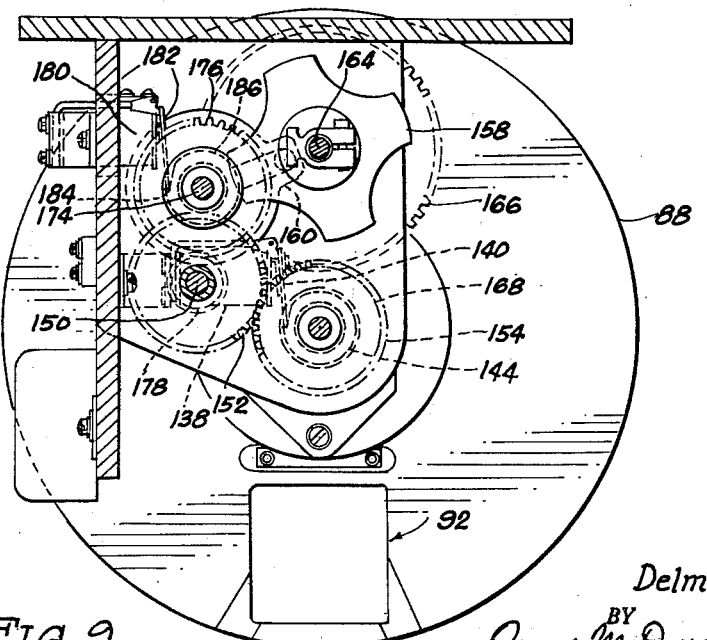
FIG. 9 is a fragmentary section, taken generally along the line 9—9 in FIG. 1.

As shown to advantage in FIG. 4, each of the illustrated slides 22 is formed with a pair of laterally projecting fins or flanges 38 adapted to be received in the slots 34. At its upper end each fin 38 has a tapered or beveled portion 40 to guide the slide into the slot 34.

In this instance, the magazine 24 is disposed above the viewing position, and the magazine is carried in an inverted position. The slides are prevented from falling out of the magazine by a detent arrangement comprising a plurality of detent springs or fingers 42 mounted on the magazine 24. As shown to advantage in FIG. 2, the detent springs 42 are provided on both side walls 32 of the magazine. In this case, the springs 42 are in the form of individual fingers projecting downwardly from a plate or strip 44 made of spring metal. Each detent spring 42 overlies one of the slots 34 in the magazine. The lower end of each detent spring 42 is curved to form a detent projection 46, adapted to be received in detent notches 48 formed in the lateral fins 38 of the slide 22. In addition to retaining the slides 22 in the magazine 24, the detent springs 42 lock the slides in their correct positions along the slots 34. It will be seen from FIG. 2 that beveled portions 50 are formed on the lower ends of the side walls 32 of the magazine so as to assist in guiding the slides into the magazine. The magazine 24 is detachably mounted on a movable carriage 52 so that the magazine may be translated longitudinally to bring any desired slide to the position at which the slide may be removed from or replaced in the magazine. In this case, the carriage 52 comprises a horizontal plate 54. The magazine 24 is adapted to be mounted on the underside of the plate 54. Any suitable arrangement may be provided for detachably securing the magazine 24 to the plate 54. In this case, headed studs 56 are mounted on the plate 54 and are adapted to be received in keyhole slots 58 formed in the upper wall 30 of the magazine. As indicated in FIG. 5, spring pressed detents 60 may be employed for accurately locating the magazine on the plate 54. An L-shaped leaf spring 62 (FIG. 2) may be mounted on the magazine and may be arranged to engage the upper side of the plate 54 so as to provide additional support for the magazine.

The carriage 52 is guided for longitudinal sliding movement by an elongated guide rod 64. Bearings 66 are mounted on the carriage and are received around the rod 64.

A driving mechanism 68 is employed to slide the carriage 52 along the guide rod 64. As shown, the driving mechanism 68 comprises a precision lead screw 70 which extends parallel to the rod 64 and is adapted to be rotated by an electric motor 72, through a speed reduction drive 74. A traveling nut 76 is threaded onto the lead screw 70 and is mounted on an arm 78 extending laterally from the carriage 52 so that rotation of the lead screw will move the carriage along the rod 64. The motor 72 may be controlled either manually or automatically so as to bring the carriage 52 into any desired position within its range of movement. In this way, any particular slide may be brought to the position at which the slide may be removed from the magazine. Any suitable control system, such as a servo system, may be employed to operate the motor 72. Thus, in the illustrated construction, a feedback potentiometer 80 is geared to the lead screw 70 by means of gears 82 and 84, for use in a servo system for controlling the operation of the motor 72. The present invention is not concerned with the details of the servo system, which may be of a type familiar to those skilled in the electronic art.

When each slide 22 is removed from the magazine 24, it is inserted into an indexing member in the form of a transfer disk 88, adapted to hold two or more slides and to carry each slide in turn to the viewing position 26.

The movement of the slides between the magazine 24 and the transfer disk 88 is carried out at a transfer station 90, displaced by 180° from the viewing station 26. The transfer disk 88 is disposed under the path of movement of the magazine 24, so that any slide in the magazine may be brought opposite the transfer station 90.

In this case the transfer disk 88 has two slide holders 92, spaced apart by 180° around the axis of the disk. Each slide holder 92 comprises a plate 94 which is mounted on one side of the disk 88 and is spaced therefrom to form a pocket 96 adapted to receive the slides. Leaf springs 98 are mounted on the plate 94 to retain the slide in the pocket 96. Each slide holder 92 is also provided with a pair of detent balls 100 which are mounted on springs 102. The detent balls 100 are adapted to be received in detent holes 104 formed in the slide 22, so that the slide will be accurately located on the indexing disk 88. As shown to advantage in FIG. 1, the edge of the transfer disk 88 is formed with a beveled portion 106 to guide the slides into the slide holder 92.

The transfer disk 88 is adapted to be rotated through successive steps of 180°, by means of a mechanism to be described in detail shortly. In this way, each slide 22 is indexed from the transfer station 90 to the viewing station 26, while the other slide, formerly in the viewing station, is returned to the transfer station.

Figure 2:
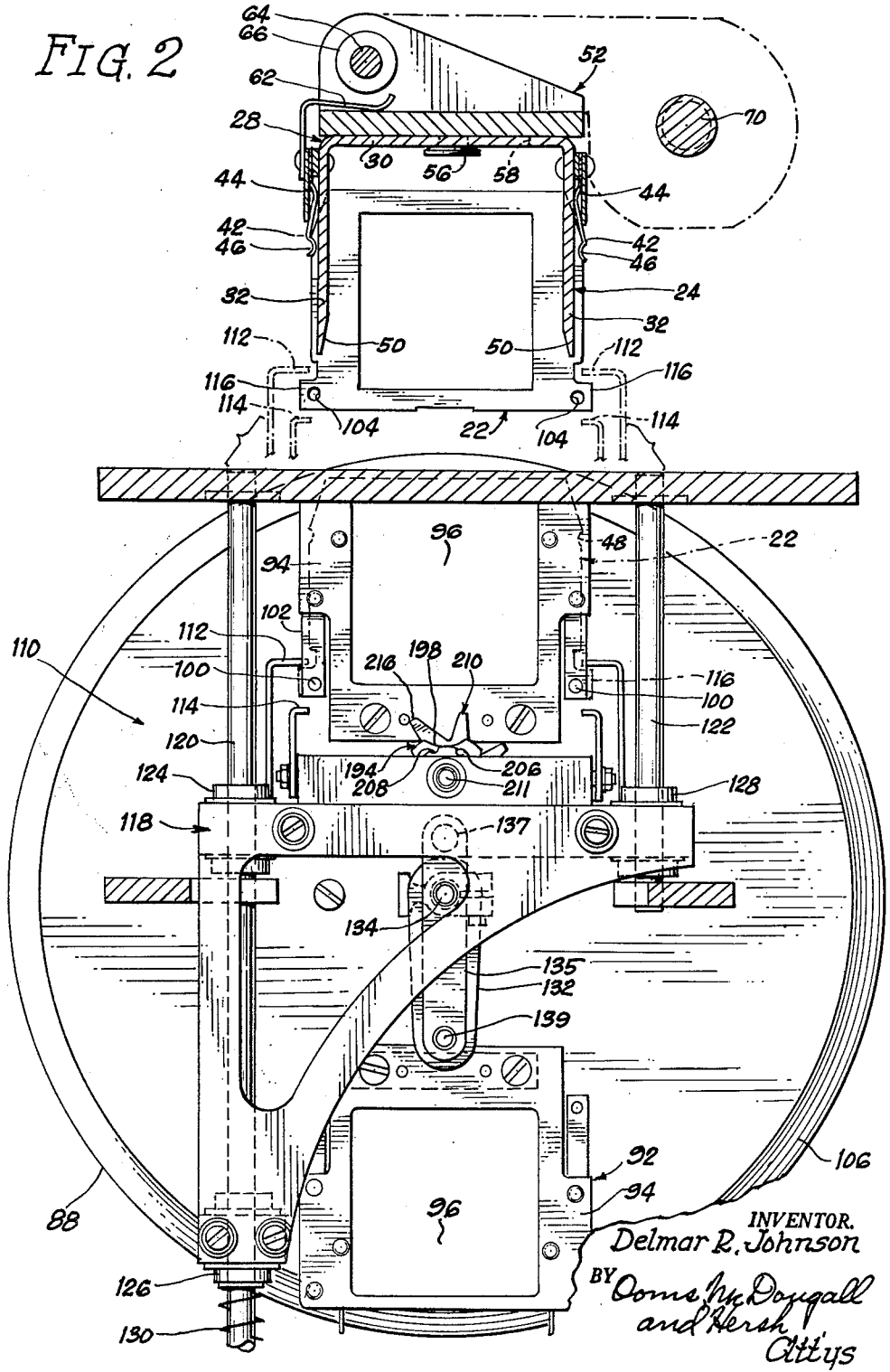
FIG. 2 is a sectional view, taken generally along a line 2—2 in FIG. 1.
Figure 3:
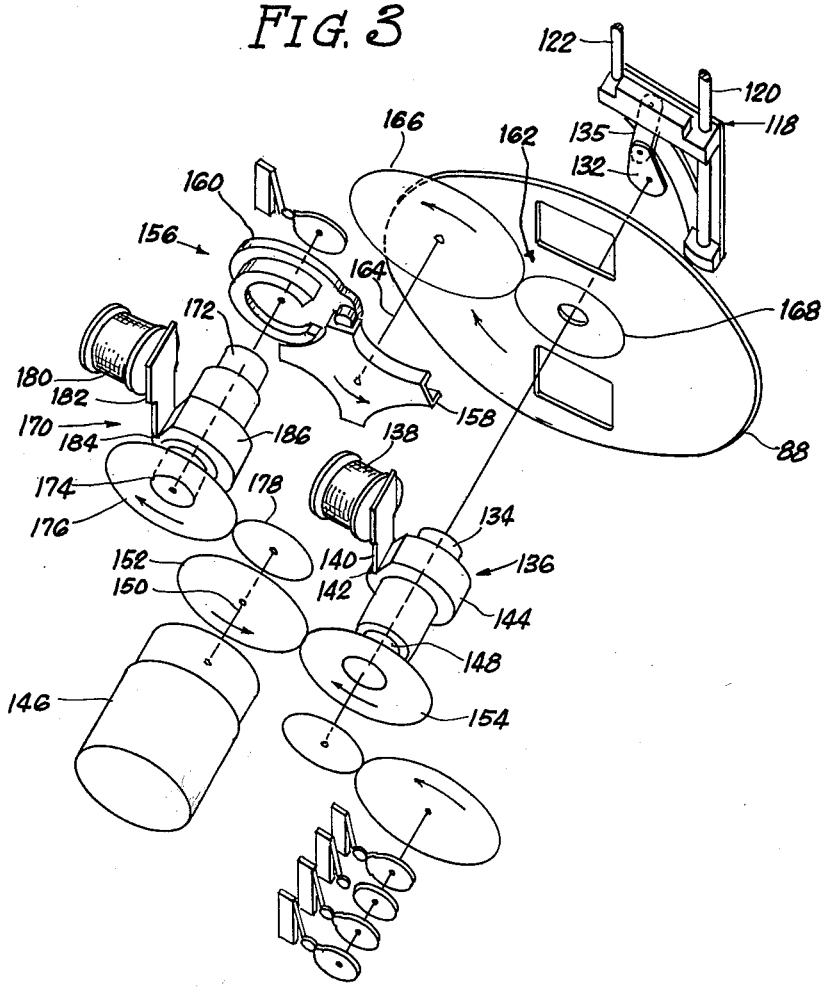
FIG. 3 is a somewhat diagrammatic perspective view, showing details of the slide changer.

The slides 22 are transferred between the magazine 24 and the transfer disk 88 by means of a transfer mechanism 110, shown to advantage in FIG. 2. It will be seen that the transfer mechanism 110 comprises two pairs of fingers 112 and 114. The fingers 112 are adapted to move the slide 22 out of the magazine 24 and into the slide holder 92 on the transfer disk 88. On the other hand, the fingers 114 are adapted to return the slide from the transfer disk 88 to the magazine 24. For convenience, the fingers 112 and 114 will be termed the feeding fingers and the return fingers respectively. It will be seen that the fingers 112 and 114 are adapted to engage laterally projecting lugs 116 which are formed on the lower end of the slide 22. The spacing between the fingers 112 and 114 is greater than the height of the lugs 116 so that the lugs 116 can pass readily between the fingers when the magazine 24 is being translated longitudinally.

The slide transfer fingers 112 and 114 are mounted on a slider or carriage 118 which is movable vertically adjacent one side of the transfer disk 88. The movement of the slider 118 is guided by elongated guide rods 120 and 122. It will be seen that the rod 120 is engaged by upper and lower bearings 124 and 126 mounted on the slider 118. The rod 122 is engaged by a single bearing 128. The weight of the slider 118 may be counterbalanced by a spring 130 coiled around the lower portion of the rod 120 and engaging the bearing 126.

Means are provided to reciprocate the slider 118 so that the fingers 112 and 114 will move the slide 22 between the magazine 24 and the transfer disk 88. In the illustrated construction, the slider 118 is adapted to be reciprocated by a crank 132 which is secured to a rotatable shaft 134. A connecting rod or link 135 is connected between the slider 118 and the carnk 132. Thus, the upper end of the link is pivotally connected to a pin 137 on the slider 118. The lower end of the link 135 is connected to a crank pin 139 on the crank 132.

Means are provided to rotate the shaft 134 through a single revolution, so as to reciprocate the slider 118 through its cycle of downward and upward movement. In the upper or initial position of the slider 118, the fingers 112 and 114 occupy the positions shown in broken lines in FIG. 2. During each cycle of the slider 118, the fingers 112 and 114 are moved downwardly, to the position shown in full lines in FIG. 2, and then are returned upwardly to their initial positions.

In this case, the shaft 134 is adapted to be rotated through one revolution by a drive which comprises a single cycle clutch 136. Such clutches are well known to those skilled in the art. It will be understood that the clutch 136 is normally disengaged so that the shaft 134 is normally stationary. The clutch 136 is engaged by the momentary energization of an electromagnet 138 which pulls a magnetic armature 140 away from a stop notch 142 on a control collar 144. The clutch 136 then causes the collar 144 and the shaft 134 to rotate through one revolution, until the armature 140 again catches in the stop notch 142, so as to arrest the movement of the collar 144. Clutches of this character will be familiar to those skilled in the art. Any other suitable type of single revolution clutch may be employed.

An electric motor 146 is employed to drive the input shaft 148 of the clutch 144. In the illustrated arrangement, the motor shaft 150 carries a gear 152 which meshes with a gear 154 of the same size, mounted on the shaft 148. Thus, the shaft 148 is continuously driven at the same speed as the motor shaft 150.

The same electric motor 146 may be employed to rotate the transfer disk 88 through successive steps of 180°. It will be seen that the illustrated machine employs a Geneva movement 156 to advance the disk 88. The Geneva movement 156 is of the usual type having a 4-armed output spider 158 and a single-toothed input wheel 160. For each revolution of the input wheel 160, the spider 158 is advanced through 90°. In order that the disk 88 may be advanced through 180°, the spider 158 is connected to the disk by a 2-to-1 drive 162. Thus, the output spider 158 is mounted on a shaft 164 which also carries a gear 166. A second gear 168 meshes with the gear 166 and is secured to the indexing disk 88. It will be seen that the gear 166 is twice as large as the gear 168, so that the disk 88 is rotated through 180° for each 90-degree movement of the spider 158.

To advance the disk 88 through 180°, the input wheel 160 of the Geneva movement 156 is rotated through one revolution. This may be brought about by a single cycle clutch 170, which may be of the same type as the clutch 136. It will be seen that the clutch 170 has an output shaft 172 which is connected to the input wheel 160 of the Geneva movement 156. The clutch 170 has an input shaft 174 which is geared to the motor shaft 150. Thus, the shaft 174 carries a gear 176 which meshes with another gear 178 mounted on the motor shaft 150.

The clutch 170 is engaged by the momentary energization of an electromagnet 180 which pulls a magnetic armature 182 out of a stop notch 184 in a control collar 186. The control collar 186 and the output shaft 172 then rotate through a single revolution, until the armature 182 again catches in the notch 184.

The transfer disk 88 is indexed by the Geneva drive 156 but is accurately located in its alternate indexed positions by means of a spring-pressed detent ball 188, adapted to seat in openings 190, which may be formed in the face of a hub 192 secured to the disk 188.

During one cycle of the slider 118, the feeding fingers 112 are effective to move one of the slides 22 from the magazine 24 to one of the slide holders 92 on the indexing disk 88. The fingers 112 and 114 then return to their original, raised position, without disturbing the slide. During the next cycle of the slider 118, the return fingers 114 move another slide back into the magazine 24 from the other slide holder 92 on the disk 88. Thus, during every other cycle of the slider 118, the return fingers 114 are moved outwardly so as to miss the lugs 116 on the slide 22 as the fingers 114 are moved upwardly. During the intervening cycles of the slider 118, the fingers 114 are moved inwardly toward each other, so as to engage the lugs 116 as the fingers 114 are moved upwardly. As shown to advantage in FIG. 6, such movement of the return fingers 114 may be brought about by means of a cam 194 having four lobes 196 separated by four valleys 198. The cam 194 is engaged by a pair of cam followers 200 which are connected to the fingers 114. Springs 202 are provided to bias the followers 200 inwardly against the cam 194. When the followers 200 are in the valleys 198, the fingers 114 are moved toward each other so that they will engage the lugs 116 on the slide 22. When the lobes 196 of the cam 194 engage the followers 200, the fingers 114 are moved outwardly so as to miss the lugs 116.

For each cycle of the slider 118, the cam 194 is rotated through 45°. The cam 194 is accurately located after each step of movement by a spring-pressed detent pin 204 which engages a detent cam 206 having eight equally spaced detent notches 208 therein.

The illustrated cam 194 is adapted to be advanced by a ratchet wheel 210 which is carried by the shaft 211 for the cams 194 and 206. The ratchet wheel 210 is adapted to be advanced by a crank pin 212 mounted on a crank arm 214. As shown, the crank arm 214 is mounted on the same shaft 134 which carries the crank 132 for operating the slider 118. The crank pin 212 engages the ratchet wheel 210 when the slider 118 is at the lower end of its range of travel. Thus, during one cycle of the slider 118, the crank pin 212 advances the ratchet wheel 210 so as to move the fingers 114 outwardly. In this way, the fingers 114 will miss the lugs 116 on the slide 22 as the slider 118 is moved upwardly. During the next cycle of the slider 118, the crank pin 212 again engages the ratchet wheel 210 so as to cause the fingers 114 to move inwardly. The fingers 114 will then engage the lugs 116 as the slider 118 is moved upwardly. It will be noted that the ratchet wheel 210 has eight teeth 216 so as to provide for rotation of the ratchet wheel through successive steps of 45°.

The initial step in the operation of the slide changer 20 is to translate the magazine 24 so that the desired slide 22 will be opposite the transfer position 90. The magazine 24 is moved to the desired position by the operation of the electric motor 72, which rotates the lead screw 70 and causes the magazine carriage 52 to be moved along the guide rod 64.

The single cycle clutch 136 is then engaged so as to reciprocate the slider through one cycle, in which the slider moves downwardly and then returns upwardly. During the downward movement of the slider 118, the feeding fingers 112 engage the lugs 116 on the slide 22 and are effective to move the slide downwardly into the adjacent slide holder 92 on the indexed disk 88.

When the slider 118 is at or near the lower end of its range of movement, the crank pin 212 rotates the ratchet wheel 210 through 45°. The lobes 196 of the cam 194 are then effective to move the fingers 114 outwardly so that they will miss the lugs 116 during the upward return movement of the slider 118.

Next, the other single cycle clutch 170 is engaged so as to rotate the transfer disk 88 through 180°. This brings the slide to the viewing position 26. The previously selected slide which was at the viewing position is returned to the transfer position 90.

In the next stage of the operation, the magazine 24 is translated so as to bring the proper empty slot 34 opposite the transfer position 90. The previously selected slide is then returned to the magazine by operating the slider 118 through another cycle. At or near the lower end of the range of movement of the slider 118, the crank pin 212 advances the ratchet wheel through 45°, so as to cause the fingers 114 to move inwardly. On the subsequent upward movement of the slider 118, the fingers 114 engage the lugs 116 and push the slide upwardly into the magazine 24.

Next, the magazine 24 is translated so as to bring another selected slide opposite the transfer position 90. This slide is moved into the adjacent slide holder 92 on the disk 88 by again causing the slider 118 to move through a cycle of reciprocation.

The indexing disk 88 may be rotated through 180° very quickly so that the change from one slide to the next may be accomplished in a very small interval of time, amounting to only a fraction of a second. While one slide is being projected, the previously projected slide is returned to the magazine. Still another slide is then transferred from the magazine into the indexing disk. Thus, the operation of the slide changer is extremely flexible, efficient and expeditious. The slides may be shown in any desired sequence.

Various modifications, alternative constructions and equivalents may be employed without departing from the true spirit and scope of the invention, as exemplified in the foregoing description, and defined in the following claims.

I claim:

1. In a slide changer, the combination comprising a movable carriage, a slide magazine removably mounted on said carriage and adapted to hold a plurality of slides, a lead screw for translating said carriage, a motor for rotating said lead screw, an indexing disk having a pair of slide holders therein for receiving the slides from said magazine, said disk being rotatable to index each of said slide holders between a transfer station adjacent said magazine and a viewing station displaced from said transfer station, a slider having a pair of feeding fingers and a pair of return fingers thereon movable between said magazine and said slide holder at said transfer station, said feeding fingers being adapted to move each slide from the magazine to the adjacent slide holder, means for reciprocating said slider to move said fingers between said magazine and said slide holder, means for indexing the disk to move the slide between the transfer and viewing positions, a cam on said slider for moving said return fingers inwardly and outwardly for selectively engaging the slide in the slide holder at the transfer position so as to return the slide from the slide holder to the magazine, a toothed wheel connected to said cam, and a crank for engaging and advancing said toothed wheel when said fingers are moved into their positions adjacent the slide holder at the transfer station.

2. In a slide changer, the combination comprising a magazine adapted to hold a plurality of slides, a rotatable indexing member having a plurality of slide holders movable between a transfer station adjacent said magazine and a viewing station displaced from said transfer station, means for translating said magazine to bring a selected slide opposite said transfer station, means for moving the selected slide from the magazine to the slide holder at the transfer station, means for rotating said indexing member to move the selected slide to the viewing station while returning a previously selected slide to the transfer station, and means for returning the previously selected slide from said indexing member to the magazine.

3. In a slide changer, the combination comprising a magazine for holding a plurality of slides, a rotatable indexing member having a plurality of slide holders movable between a transfer station adjacent said magazine and a viewing station displaced from said transfer station, means for translating said magazine to bring a selected slide opposite said transfer station, a slider having feeding fingers and return fingers thereon for feeding the selected slide from the magazine to the adjacent slide holder and for returning the slides to the magazine, means for rotating said indexing member to carry the selected slide to the viewing station while returning a previously selected slide to the transfer station, means for reciprocating said slider through a complete cycle, and means for disabling said return fingers during every other cycle of said slider so that one slide will be fed from the magazine to the adjacent slide holder during one cycle of the slider, and another slide will be returned from the slide holder to the magazine during the next cycle of the slider.

4. In a slide changer, the combination comprising a magazine for holding a plurality of slides, a rotatable indexing member having a plurality of slide holders movable between a transfer station adjacent said magazine and a viewing station displaced from said transfer station, means for translating said magazine to bring a selected slide opposite said transfer station, a slider having feeding fingers thereon engageable with the slide in the magazine opposite the transfer station, means for reciprocating said slider through a complete cycle so that said feeding fingers will move the slide from the magazine to the adjacent slide holder and then will return to their initial positions, means for rotating said indexing member to move the selected slide to the viewing station while returning a previously selected slide to the transfer station, return fingers movably mounted on said slider for returning the previously selected slide to the magazine during the next cycle of said slider, and means for moving said return fingers to a disabling position during every other cycle of said slider so that a selected slide will be fed from the magazine to the indexing member during one cycle of the slider, and a previously selected slide will be returned to the magazine during the next cycle of the slider.

5. In a slide changer, the combination comprising a magazine for holding a plurality of slides, a rotatable indexing member having a plurality of slide holders movable between a transfer station adjacent said magazine and a viewing station displaced from said transfer station, means for translating said magazine to bring a selected slide opposite said transfer station, a slider having feeding fingers thereon engageable with the slide in the magazine opposite the transfer station, means for reciprocating said slider through a complete cycle so that said feeding fingers will move the slide from the magazine to the adjacent slide holder and then will return to their initial positions, means for rotating said indexing member to move the selected slide to the viewing station while returning a previously selected slide to the transfer station, return fingers movably mounted on said slider for returning the previously selected slide to the magazine during the next cycle of said slider, a cam on said slider for moving said return fingers between operative and disabled positions, and means for advancing said cam through one step during each cycle of said slider so that said return fingers will be moved to said disabled position during alternate cycles of said slider and will be moved to the operative position during the intervening cycles thereof.

6. In a slide changer, the combination comprising a magazine for holding a plurality of slides, a rotatable indexing member having a plurality of slide holders movable between a transfer station adjacent said magazine and a viewing station displaced from said transfer station, means for translating said magazine to bring a selected slide opposite said transfer station, a slider having feeding fingers thereon engageable with the slide in the magazine opposite the transfer station, means for reciprocating said slider through a complete cycle so that said feeding fingers will move the slide from the magazine to the adjacent slide holder and then will return to their initial positions, means for rotating said indexing member to move the selected slide to the viewing station while returning a previously selected slide to the transfer station, return fingers movably mounted on said slider for returning the previously selected slide to the magazine during the next cycle of said slider, a cam mounted on said slider for moving said return fingers between operative and disabled positions, a toothed wheel connected to said cam, and a crank for advancing said toothed wheel through one step during each cycle of said slider so that said return fingers will be alternately moved to said operative and disabled positions during the successive cycles of said slider.

7. In a slide changer, the combination comprising a movable carriage, a slide magazine removably mounted in said carriage and adapted to hold a plurality of slides, a rotatable indexing wheel having a pair of slide holders thereon movable between a transfer station adjacent said magazine and a viewing station displaced by substantially 180° from said transfer station, a lead screw for translating said carriage, a motor for rotating said lead screw to bring a selected slide opposite said transfer station, a slider having feeding fingers and return fingers mounted thereon for moving slides between the magazine and the indexing wheel, means for reciprocating said slider through a complete cycle so that said feeding fingers will move the selected slide from the magazine to the adjacent slide holder, means for indexing said wheel to bring the selected slide from the transfer station to the viewing station while returning a previously selected slide to the transfer station, said return fingers being effective to return the previously selected slide to the magazine during the next cycle of said slider, a cam on said slider for moving said feeding fingers between operative and disabled positions, a toothed wheel connected to said cam, and a crank for advancing said toothed wheel through one step during each cycle of said slider so that said return fingers will be moved alternately between said disabled and operative positions during successive cycles of said slider.

8. In a slide changer, the combination comprising a magazine for holding a plurality of slides, a rotatable indexing member having a plurality of slide holders movable between a transfer station adjacent said magazine and a viewing station displaced from said transfer station, means for moving said magazine to bring a selected slide opposite said transfer station, a feeder having feeding fingers and return fingers thereon for feeding the selected slide from the magazine to the adjacent slide holder and for returning the slides to the magazine, means for rotating said indexing member to carry the selected slide to the viewing station while returning a previously selected slide to the transfer station, means for oscillating said feeder through a complete cycle, and means for disabling said return fingers during every other cycle of said feeder so that one slide will be fed from the magazine to the adjacent slide holder during one cycle of the feeder, and another slide will be returned from the slide holder to the magazine during the next cycle of the feeder.

9. In a slide changer, the combination comprising a magazine adapted to hold a plurality of slides, an indexing member having a plurality of slide holders movable between a transfer station adjacent said magazine and a viewing station displaced from said transfer station, means for moving said magazine to bring a selected slide opposite said transfer station, a feeder having feeding fingers thereon engageable with the slide in the magazine opposite the transfer station, means for oscillating said feeder through successive cycles so that said feeding fingers will move the slide from the magazine to the adjacent slide holder and then will return to their initial positions, means for moving said indexing member to move the selected slide to the viewing station while returning a previously selected slide to the transfer station, return fingers movably mounted on said feeder for returning a previously selected slide to the magazine during the next cycle of said feeder, and means for moving said return fingers to a disabled position during every other cycle of said feeder so that a selected slide will be fed from the magazine to the indexing member during one cycle of the feeder, and a previously selected slide will be returned to the magazine during the next cycle of the feeder.

10. In a slide changer, the combination comprising a magazine adapted to hold a plurality of slides, a movable indexing member having a plurality of slide holders movable with said member between a transfer station adjacent said magazine and a viewing station displaced from said transfer station, means for moving said magazine to bring a selected slide opposite said transfer station, a feeder having feeding means thereon engageable with the slide in the magazine opposite the transfer station, means for oscillating said feeder through successive cycles so that said feeding means will move the slide from the magazine to the adjacent slide holder and then will return to the initial position, means for moving said indexing member to move the selected slide to the viewing station while returning a previously selected slide to the transfer station, return means movably mounted on said feeder for returning the previously selected slide to the magazine during the next cycle of said feeder, and means for disabling said return means during every other cycle of said feeder so that a selected slide will be fed from the magazine to the indexing member during one cycle of said feeder, and a previously selected slide will be returned to the magazine during the next cycle of said feeder.

11. In a slide changer, the combination comprising a magazine adapted to hold a plurality of slides, a movable indexing member having a plurality of slide holders mounted thereon and movable therewith between a transfer station adjacent said magazine and a viewing station displaced from said transfer station, means for moving said magazine to bring a selected slide opposite said transfer station, a feeder movable between the magazine and the transfer station and having means thereon for engaging and moving the selected slide from the magazine to the slide holder at the transfer station, and means for moving said indexing member to move the selected slide to the viewing station while returning a previously selected slide from the viewing station to the transfer station, said feeder being operative to engage and return the previously selected slide from the transfer member to the magazine.

12. In a slide changer, the combination comprising a magazine for holding a plurality of slides, a rotatable indexing member having a pair of diametrically opposite slide holders thereon movable therewith between a transfer station adjacent said magazine and a viewing station displaced from said transfer station, means for moving said magazine to bring a selected slide opposite said transfer station, a feeder for moving the selected slide from the magazine to the slide holder at the transfer station, and means for rotating said indexing member to move the selected slide to the viewing station while returning a previously selected slide to the transfer station, said feeder being operative to return the previously selected slide from said indexing member to the magazine.

13. In a slide changer, the combination comprising a magazine for holding a plurality of slides, a rotatable indexing member having a plurality of slide holders thereon movable therewith between a transfer station adjacent said magazine and a viewing station displaced from said transfer station, means for moving said magazine to bring a selected slide opposite said transfer station, a feeder for moving the selected slide from the magazine to the slide holder at the transfer station, and means for rotating said indexing member to move the selected slide to the viewing station while returning a previously selected slide to the transfer station, said feeder being operative to return the previously selected slide from said indexing member to the magazine.

References Cited in the file of this patent

UNITED STATES PATENTS

| | | |
|---|---|---|
| 2,076,924 | Spindler | Apr. 13, 1937 |
| 2,146,452 | Spindler | Feb. 7, 1939 |
| 2,319,284 | Zwirn | May 18, 1943 |
| 2,938,287 | Bernabei | May 31, 1960 |
| 2,967,457 | Jackson | Jan. 10, 1961 |